United States Patent
Nishri et al.

(10) Patent No.: US 9,889,995 B1
(45) Date of Patent: Feb. 13, 2018

(54) NONCONTACT SUPPORT PLATFORM WITH BLOCKAGE DETECTION

(71) Applicant: Core Flow Ltd., Daliyat al-Karmel (IL)

(72) Inventors: Boaz Nishri, Kibbutz Maagan Michael (IL); Ronen Lautman, Haifa (IL)

(73) Assignee: Core Flow Ltd., Yoqneam Ilit (IL)

( * ) Notice: Subject to any disclaimer, the term of this patent is extended or adjusted under 35 U.S.C. 154(b) by 0 days.

(21) Appl. No.: 15/458,981

(22) Filed: Mar. 15, 2017

(51) Int. Cl.
*B65G 51/03* (2006.01)

(52) U.S. Cl.
CPC .................. *B65G 51/03* (2013.01)

(58) Field of Classification Search
CPC ........ B65G 51/03; B65G 53/02; B65G 53/28; B65G 53/66; B65G 2207/06; B65G 2812/16; B65G 2812/165
USPC .......................... 406/11, 34, 88, 89; 414/676
See application file for complete search history.

(56) References Cited

U.S. PATENT DOCUMENTS

| | | | | |
|---|---|---|---|---|
| 3,706,476 A * | 12/1972 | Thomas-Collignon | | B65G 51/03 137/804 |
| 3,788,231 A * | 1/1974 | Bloomfield | ............. | B60V 3/04 104/134 |
| 3,865,254 A * | 2/1975 | Johannsmeier | ....... | G03F 7/7075 198/394 |
| 3,976,330 A * | 8/1976 | Babinski | ................ | B65G 51/03 406/84 |
| 4,165,132 A * | 8/1979 | Hassan | ................... | B65G 51/03 104/134 |
| 4,293,249 A * | 10/1981 | Whelan | .................. | B65G 51/03 406/72 |
| 4,299,518 A * | 11/1981 | Whelan | .................. | B65G 51/03 406/62 |
| 4,618,292 A * | 10/1986 | Judge | ..................... | B65G 51/03 198/394 |
| 4,718,539 A * | 1/1988 | Fukuwatari | ............ | B65G 51/03 104/292 |
| 4,940,131 A * | 7/1990 | Swartz | .................. | B65G 53/66 198/524 |
| 5,431,527 A * | 7/1995 | Yamazaki | ................ | B23Q 1/28 384/12 |
| 5,868,549 A * | 2/1999 | Lee | ....................... | B65G 57/245 414/676 |
| 5,921,744 A * | 7/1999 | Toda | ................. | H01L 21/67787 414/755 |
| 6,743,338 B2 * | 6/2004 | Graeffe | ............. | G01B 11/0691 162/198 |

(Continued)

*Primary Examiner* — Joseph Dillon, Jr.
(74) *Attorney, Agent, or Firm* — Pearl Cohen Zedek Latzer Baratz LLP

(57) ABSTRACT

A noncontact support platform includes a plurality of pressure nozzles on an outer surface of a PV stage of the noncontact support platform. The pressure nozzles connected to a pressure source for creating an outflow of fluid through the pressure nozzles. A plurality of vacuum nozzles are interspersed with the pressure nozzles on the outer surface and are connected to a vacuum manifold via one or a plurality of hoses to create an inflow of the fluid through the vacuum nozzles. At least one flowmeter is configured to generate a signal that is indicative of a measured inflow via at least one hose of the hoses. A controller is configured to analyze the signal to determine whether the measured inflow is indicative of blockage of a vacuum nozzle and to generate a response when blockage is indicated.

20 Claims, 3 Drawing Sheets

(56) References Cited

U.S. PATENT DOCUMENTS

| | | | | |
|---|---|---|---|---|
| 6,764,253 B1* | 7/2004 | Pfeiffer | B65G 53/521 | 406/11 |
| 6,935,813 B2* | 8/2005 | Van Dorst | B65G 53/66 | 137/114 |
| 7,080,960 B2* | 7/2006 | Burnett | B65G 43/08 | 406/11 |
| 7,393,159 B2* | 7/2008 | Chang | B65G 49/065 | 406/88 |
| 7,604,439 B2* | 10/2009 | Yassour | B24B 37/30 | 406/86 |
| 7,905,195 B2* | 3/2011 | Yamasaki | H01L 21/6715 | 118/300 |
| 7,908,995 B2* | 3/2011 | Inamasu | B65G 49/065 | 118/300 |
| 7,997,289 B1* | 8/2011 | Frost | B08B 3/12 | 134/133 |
| 8,057,602 B2* | 11/2011 | Koelmel | H01L 21/67115 | 118/728 |
| 8,083,896 B2* | 12/2011 | Hughes | B65H 20/14 | 162/263 |
| 8,137,046 B2* | 3/2012 | Kishimoto | H01L 21/67748 | 406/88 |
| 8,256,370 B2* | 9/2012 | Kitano | G03F 7/162 | 118/320 |
| 2005/0098016 A1* | 5/2005 | Benuzzi | B65G 51/03 | 83/733 |
| 2006/0054774 A1* | 3/2006 | Yassour | B65G 51/03 | 248/631 |
| 2006/0193704 A1* | 8/2006 | Simontacchi | B05B 7/1459 | 406/88 |
| 2006/0219605 A1* | 10/2006 | Devitt | B65G 49/065 | 209/37 |
| 2007/0215437 A1* | 9/2007 | Cassagne | B65G 49/065 | 198/377.04 |
| 2008/0124179 A1* | 5/2008 | Fleckten | B65G 53/528 | 406/50 |
| 2008/0145156 A1* | 6/2008 | Livingood | B65G 53/48 | 406/14 |
| 2015/0239682 A1* | 8/2015 | Wang | H01L 21/67784 | 414/676 |
| 2015/0314968 A1* | 11/2015 | Van Ostayen | H01L 21/67784 | 406/88 |
| 2015/0336751 A1* | 11/2015 | Tsunoda | B65G 49/065 | 406/88 |
| 2016/0264360 A1* | 9/2016 | Chen | B65G 49/066 | |

* cited by examiner

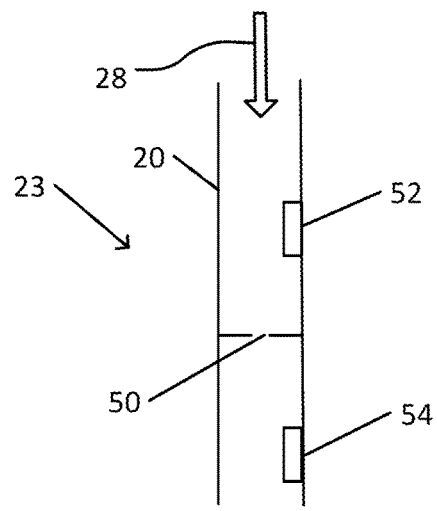
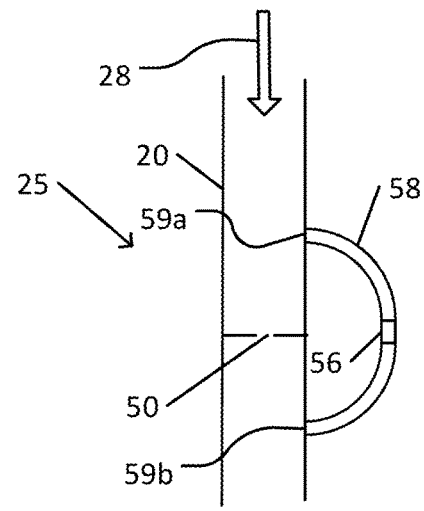
Fig. 2A                Fig. 2B
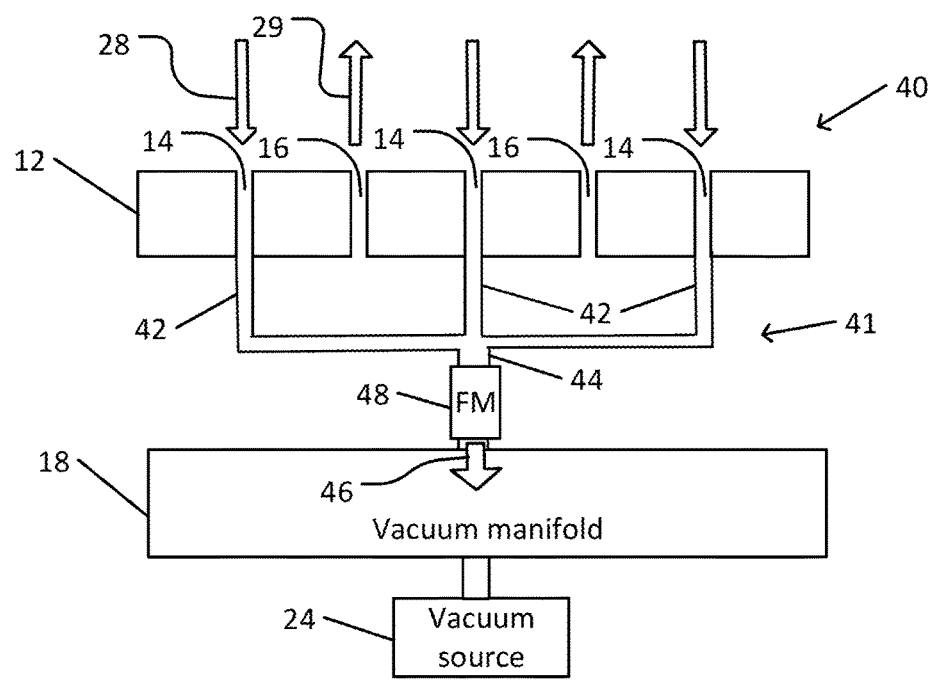
Fig. 3A

NONCONTACT SUPPORT PLATFORM WITH BLOCKAGE DETECTION

FIELD OF THE INVENTION

The present invention relates to noncontact support platforms. More particularly, the present invention relates to a noncontact support platform that is configured to detect blockage of a vacuum nozzle.

BACKGROUND OF THE INVENTION

A noncontact support surface includes an arrangement of pressure nozzles and vacuum nozzles on the surface of a pressure-vacuum (PV) stage. The pressure nozzles are connected a pressure source so as to cause an outflow of air from the PV stage. The vacuum nozzles are connected to a vacuum source such that air is sucked into the PV stage via the vacuum nozzles.

The outflow of air through the pressure nozzles and the inflow of air through the vacuum nozzles may create an air cushion that is capable of supporting an object (e.g., a flat object). The outflow and inflow may create a fluidic spring effect that resists any change in distance between the object and the surface of the stage. Thus, the noncontact support surface may support the object at a fixed distance from the stage surface. The stage may support the object from below or from above.

Interruption of air flow through one or more nozzles may decrease the uniformity of the air cushion. Thus, a blocked nozzle may affect the distance between the object, or a portion of the object near the blocked nozzle, and the stage surface. A deviation of the distance from an expected distance could adversely affect the quality of a measurement or process that is performed on the object.

SUMMARY OF THE INVENTION

There is thus provided, in accordance with an embodiment of the present invention, a noncontact support platform including: a plurality of pressure nozzles on an outer surface of a PV stage of the noncontact support platform, the pressure nozzles connected to a pressure source for creating an outflow of fluid through the pressure nozzles; a plurality of vacuum nozzles that are interspersed with the pressure nozzles on the outer surface and that are connected to a vacuum manifold via one or a plurality of hoses to create an inflow of the fluid through the vacuum nozzles, at least one flowmeter that is configured to generate a signal that is indicative of a measured inflow via at least one hose of the one or a plurality of hoses; and a controller that is configured to analyze the signal to determine whether the measured inflow is indicative of blockage of a vacuum nozzle of the plurality of vacuum nozzles and to generate a response when the blockage is indicated.

Furthermore, in accordance with an embodiment of the present invention, each vacuum nozzle of the plurality of vacuum nozzles is connected to the vacuum manifold by a separate hose.

Furthermore, in accordance with an embodiment of the present invention, each separate hose includes a separate flowmeter that is that is configured to generate a signal that is indicative of a measured inflow via the separate hose.

Furthermore, in accordance with an embodiment of the present invention, a plurality of the vacuum nozzles are connected to the vacuum manifold by a single branched hose.

Furthermore, in accordance with an embodiment of the present invention, each of the plurality of the vacuum nozzles is connected to a branch of the branched hose.

Furthermore, in accordance with an embodiment of the present invention, the at least one flowmeter is located on a trunk of the branched hose, such that the flowmeter is configured to generate a signal that is indicative of a measured combined inflow through the plurality of the vacuum nozzles.

Furthermore, in accordance with an embodiment of the present invention, the branched hose includes an intermediate hose branch of the branched hose, the at least one flowmeter being located on the intermediate hose branch such that the flowmeter is configured to generate a signal that is indicative of a measured combined inflow through monitored vacuum nozzles of the plurality of vacuum nozzles whose branches are connected to intermediate hose branch upstream of the flowmeter.

Furthermore, in accordance with an embodiment of the present invention, unmonitored vacuum nozzles of the plurality of vacuum nozzles whose branches join with the intermediate hose branch downstream of the flowmeter are provided with compensating structure to cause the inflow through each of the unmonitored vacuum nozzles is substantially equal to inflow through each of the monitored vacuum nozzles.

Furthermore, in accordance with an embodiment of the present invention, the flowmeter includes a constriction.

Furthermore, in accordance with an embodiment of the present invention, the constriction includes an orifice.

Furthermore, in accordance with an embodiment of the present invention, the flowmeter includes a pressure transducer to generate a signal that is indicative of fluid pressure in the hose upstream of the constriction and a pressure transducer to generate a signal that is indicative of fluid pressure in the hose downstream of the constriction.

Furthermore, in accordance with an embodiment of the present invention, the flowmeter includes a pressure transducer to generate a signal that is indicative of difference between fluid pressure upstream of the constriction and fluid pressure downstream of the constriction.

Furthermore, in accordance with an embodiment of the present invention, the response includes operating an output device to generate an alarm.

Furthermore, in accordance with an embodiment of the present invention, the controller is configured to determine whether the measured inflow is indicative of the blockage by comparing the measured inflow with a threshold value of the inflow.

Furthermore, in accordance with an embodiment of the present invention, the controller is configured to determine whether the measured inflow is indicative of the blockage by comparing the time that the measured inflow persists with a minimum time period.

There is further provided, in accordance with an embodiment of the present invention, a method for detecting blockage of one or a plurality of vacuum nozzles of a noncontact support platform, the method including: obtaining a signal that is generated by a flowmeter, the flowmeter included in a hose that connects at least one vacuum nozzle of the one or a plurality of vacuum nozzles on an outer surface of the PV stage to a vacuum manifold, the signal being indicative of a measured inflow via the hose; analyzing the signal to determine whether the measured inflow is indicative of blockage of a vacuum nozzle of the plurality of vacuum nozzles; and generating a response when the blockage is indicated.

Furthermore, in accordance with an embodiment of the present invention, generating the response includes operating an output device.

Furthermore, in accordance with an embodiment of the present invention, analyzing the signal includes processing the signal to obtain a value and comparing the obtained value with a threshold value.

Furthermore, in accordance with an embodiment of the present invention, analyzing the signal includes comparing a time of persistence of the obtained value with a minimum period of time.

Furthermore, in accordance with an embodiment of the present invention, analyzing the signal includes comparing the indicated measured inflow with inflow through an external vacuum nozzle.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

FIG. 2A schematically illustrates a flowmeter with pressure transducers for blockage detection in the noncontact platform shown in FIG. 1A.

FIG. 2B shows a flowmeter with a pressure differential transducer for blockage detection in the noncontact platform shown in FIG. 1A.

FIG. 3A schematically illustrates an example of a noncontact platform with blockage detection in which a plurality of vacuum nozzles are connected by a branched hose to a vacuum manifold.

DETAILED DESCRIPTION OF THE INVENTION

Figure 1A:
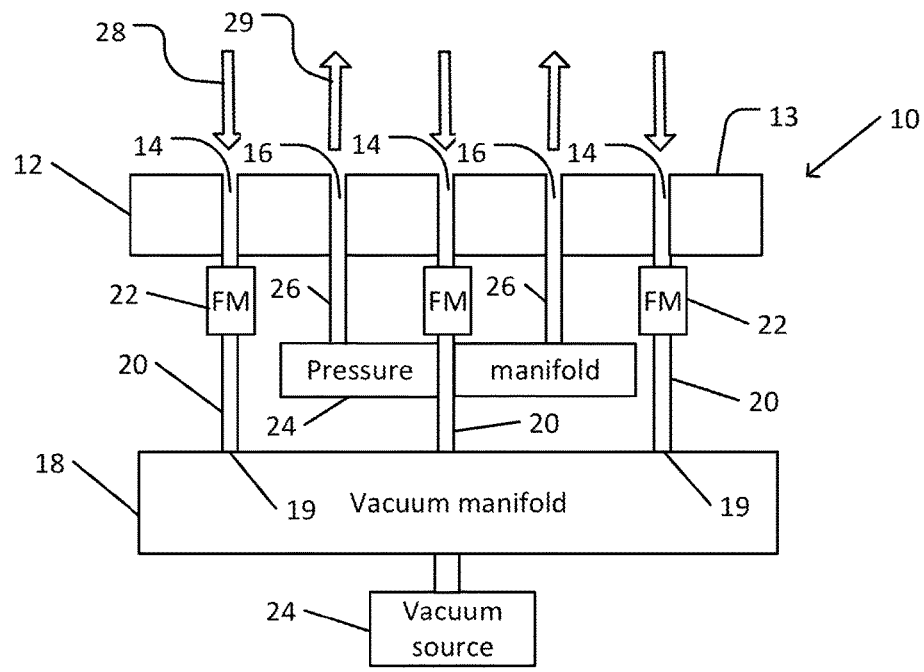
FIG. 1A schematically illustrates an example of a noncontact platform with blockage detection in which each vacuum nozzle is connected by a separate hose to a vacuum manifold.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a noncontact support platform may be configured to detect a blockage or other interruption of inflow of air or another fluid through vacuum nozzles of a pressure-vacuum (PV) stage. For example, an appropriate flowmeter may detect a reduction in inflow due to blockage of the vacuum nozzle. The flowmeter may be configured to generate a signal that may be transmitted to a controller. The controller may be configured to generate an alert, to modify operation, or otherwise respond to a signal that is indicative of blockage of a vacuum nozzle.

Each vacuum nozzle is connected to a vacuum source via one or more vacuum manifolds that are connected to the vacuum source. The vacuum source may include a vacuum ejector, a vacuum pump, or another type of vacuum source. The type of vacuum source used may depend on the requirements of a particular noncontact support platform, or of a particular application of the noncontact support platform. For example, considerations that may affect selection of a vacuum source may include the number of vacuum nozzles, the desired inflow through each of the vacuum nozzles, an acceptable level of ambient noise, or other considerations.

The vacuum nozzles are typically interspersed with pressure nozzles on a pressure-vacuum (PV) stage of the noncontact support platform. Pressure nozzles may be connected to a pressure source that causes an outflow of air or another fluid at the surface of the PV stage. Typically, the fluid outflow may be expected to expel any foreign matter from the pressure nozzles, such that blockage of a pressure nozzles may be relatively rare. Therefore, although a hose that connects a pressure nozzle to a pressure source may also be provided with a flowmeter as described herein, such a flowmeter may be deemed unnecessary under typical conditions.

An arrangement of hoses, pipes, tubes, conduits, or other connections (any of which is referred to herein as vacuum hose) connect each vacuum nozzle to the vacuum manifold. In some cases, each vacuum nozzle may be connected to the vacuum manifold by a separate vacuum hose. In some cases, a single vacuum hose may connect a group of vacuum nozzles to the vacuum manifold. For example, a single vacuum hose that connects to the vacuum manifold may branch into separate branches for connection to each of the vacuum nozzles. As another example, the PV stage may include incorporate conduits that connect a plurality of (e.g., neighboring vacuum nozzles) to a connection with a single vacuum hose.

Each vacuum hose is provided with a flowmeter to measure the inflow through the hose. The flowmeter may be configured so as to produce a signal that is readable by a controller or computer.

Depending on how the vacuum nozzles are connected to the vacuum manifold, the measured inflow may be affected by the inflow through one or more vacuum nozzles. For example, the measured inflow may be affected by a clog or blockage of one or more of the vacuum nozzles.

If each vacuum nozzle is connected to the vacuum manifold by a separate vacuum hose, each vacuum hose may be provided with a separate flowmeter. In this case, the inflow that is measured by each flowmeter may be indicative of the inflow through the single vacuum nozzle to which the corresponding vacuum hose is connected. Thus, any measured reduction in the inflow may be indicative of blockage of that one vacuum nozzle. In this case, a relatively large number of vacuum hoses and flowmeters may be required. On the other hand, a flowmeter with relatively low or coarse sensitivity may be adequate to detect a partial blockage of the vacuum nozzle. Therefore, relatively simple and inexpensive flowmeters may be used.

On the other hand, a single hose may connect a plurality of vacuum nozzles to the vacuum manifold. For example, the hose may be branched, bifurcated (e.g., multiply bifurcated), or otherwise configured such that one end of the hose forms a single trunk section, and the other end of the hose forms a plurality of branch hoses. Thus, the hose may connect a single opening in the vacuum manifold at a proximal end to a plurality of vacuum nozzles at a distal end. The plurality of vacuum nozzles that are connected to a single hose may be neighboring vacuum nozzles on the PV stage of the noncontact support platform. The flowmeter may be positioned on a section of a branched hose that is common to the inflow from all of the vacuum nozzles that are connected to a single hose. For example, the flowmeter may be located on a trunk section of the hose near the vacuum manifold that is proximal to any branching or bifurcation of the hose. In this case, the measured flow may be affected by a reduction in inflow through any of the vacuum nozzles that are connected to the single hose. Detection of such a reduction through one of the hoses may require a flowmeter with sufficient sensitivity to detect a change in inflow through the trunk section that is caused by change in the inflow through one of the vacuum nozzles. Alternatively, one or in addition, one or more of the branch hoses may be provided with a separate flowmeter.

A flowmeter may include a constriction through which the inflow passes. For example, the constriction may include a single orifice, a cascade of orifices, or another type of constriction. Pressure transducers may be configured to measure fluid pressure on either side, e.g., the upstream and downstream sides, of the constriction. The measured differential pressure between the two sides of the constriction may be indicative of a flow rate.

A pressure transducer may be configured to generate an electric signal that is indicative of a measured pressure or pressure differential. The electric signals may be transmitted to a controller. For example, a pressure transducer may be connected via a wire, cable, or other connection to suitable connector or port of a receiver device that is configured to receive the electric signal. The receiver device may be incorporated into, or may be separate from, the controller. Alternatively or in addition, a pressure transducer may be configured to wirelessly transmit a signal that is receivable by the controller.

The controller, e.g., a processor of the controller, may be configured to analyze or interpret the received signals. In some cases, the signals may be indicative of reduced inflow through a vacuum port. For example, the controller may be configured to detect a reduction in inflow rate that persists for a predetermined period of time. The predetermined period of time may correspond to a period of time that typically elapses (e.g., 30 seconds to 60 seconds) before a measurement of the flow rate is stabilized following blockage or another change. A measured change in pressure differential or flow rate may be compared with a threshold change.

A constriction (e.g., orifice or other constriction) of the flowmeter may be selected so as to produce a pressure change in a desired range. For example, it may be determined that a pressure differential of in the range of about 0.1 millibar to about 0.3 millibar, e.g., about 0.2 millibar, may be advantageous for measurement or analysis. For example, a constriction may be selected such that when a nominal airflow rate of is about 20 standard liters per minute results in a pressure differential of about 10 millibar, a reduction in airflow to about 19 NL/min will result in a pressure differential of about 9.8 millibar.

Figure 1B:
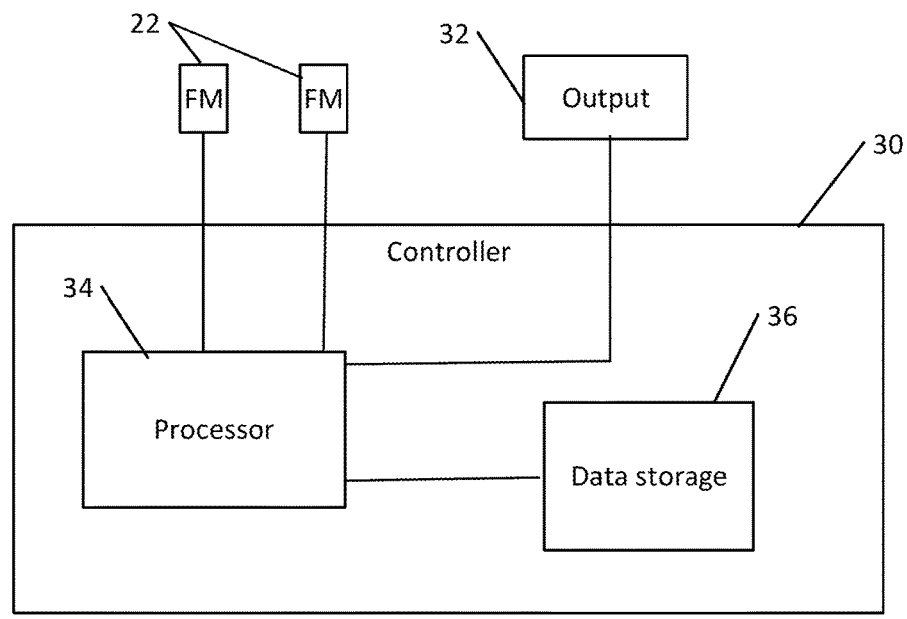
FIG. 1B is a schematic block diagram of a controller for blockage detection in the noncontact platform shown in FIG. 1A.

FIG. 1A schematically illustrates an example of a noncontact platform with blockage detection in which each vacuum nozzle is connected by a separate hose to a vacuum manifold. FIG. 1B is a schematic block diagram of a controller for blockage detection in the noncontact platform shown in FIG. 1A.

Noncontact platform 10 includes a PV stage 12 that is configured to form a fluid cushion (the fluid typically including air or another gas) for supporting an object at an approximately fixed distance from outer surface 13 of PV stage 12. A typical object may include a thin flat object such as a silicon substrate, glass sheet, or other thin flat object.

PV stage 12 typically includes a plurality of pressure nozzles 16 that are interspersed with a plurality of vacuum nozzles 14. Fluid flowing out of pressure nozzles 16 with pressure outflow 29 and into vacuum nozzles 14 with vacuum inflow 28 may create a fluid cushion at outer surface 13 for noncontact support of an object.

Each pressure nozzle 16 is connected by a pressure hose 26 to a pressure manifold 24. For example, each pressure hose 26 may separately connect each pressure nozzles 16 to a separate port of pressure manifold 24. Alternatively or in addition, one or more pressure hoses 26 may include a branched hose that connects two or more pressure nozzles 16 to a single port o pressure manifold 24. When pressure manifold 24 is connected to a pressure source (e.g., a pump, blower, or other pressure source) and the pressure source is operating, fluid may flow outward from each pressure nozzle 16 as indicated by pressure outflow 29.

Typically, pressure outflow 29 may be expected to be sufficiently strong to prevent accumulation of dirt or debris in pressure nozzles 16 so as to obstruct pressure outflow 29 through pressure nozzles 16.

Each vacuum nozzle 14 is connected by a vacuum hose 20 to vacuum manifold 18. In some cases, each vacuum nozzle 14 may be provided with a constricting fins, e.g., in the form of a self adaptive segmented orifice (SASO) labyrinth.

In the example shown, each vacuum nozzle 14 is connected by a separate vacuum hose 20 to a single vacuum port 19 of vacuum manifold 18. Vacuum manifold 18 may be connected to vacuum source 24. For example, vacuum source 24 may include a vacuum pump, a vacuum ejector, or another source of vacuum or suction. When vacuum manifold 18 is connected to vacuum source 24 and vacuum source 24 is operating, fluid may flow inward through each vacuum nozzle 14 as indicated by vacuum inflow 28.

Rates of pressure outflow 29 and of vacuum inflow 28 may be selected to create a fluid cushion with particular characteristics. For example, the air cushion may be configured or optimized to support a particular type of object at a particular distance from outer surface 13 of PV stage 12. The air cushion may be configured to provide a particular fluidic spring effect.

For example, when the fluid is air, a typical airflow of pressure outflow 29 or vacuum inflow 28 may be in the range of about 20 standard liters per minute to about 40 standard liters per minute. (The temperature and pressure values that characterize a standard liter may vary among different users and among different applications.) The ratio of vacuum inflow 29 to pressure outflow 28 (e.g., when no supported object covers the corresponding vacuum nozzles 14 and pressure nozzles 16) may typically be greater than 1, e.g., about 1.5 or another value greater than 1. (For example, the ratio may be selected such that vacuum inflow 29 is equal to pressure outflow 28 when a supported object covers the corresponding vacuum nozzles 14 and pressure nozzles 16.)

In some cases, vacuum inflow 28 may suck dirt, debris, soot, oils, or other particulate matter from the environment into one or more vacuum nozzles 14. The matter may at least partially obstruct the affected vacuum nozzles 14 so as to reduce vacuum inflow 28 through the affected vacuum nozzles 14.

In the example shown, each vacuum hose 20 is provided with a flowmeter (FM) 22. Each flowmeter 22 is configured to produce a signal that is indicative of vacuum inflow 28 through the vacuum hose 20 whose fluid inflow is measured by that flowmeter 22. For example, the signal may be an electrical signal that is transmissible via an electric cable, an electromagnetic signal that is transmissible via electromagnetic waves, an optical signal that is transmissible via an optical fiber or directly (e.g., along a line of sight between an optical transmitter and an optical receiver), or another type of signal.

Controller 30 may be configured to receive and analyze signals that are transmitted by one or more flowmeters 22. For example, a processor 34 of controller 30 may be configured to analyze signals that are transmitted by a flowmeter 22.

Processor 34 of controller 30 may include one or more processing units, e.g., of one or more computers. Processor 34 may be configured to operate in accordance with programmed instructions stored on data storage 36.

Processor 34 may communicate with data storage 36. Data storage 36 may include one or more volatile or nonvolatile, fixed or removable, data storage devices or memory devices. Data storage 36 may be utilized to store, for example, programmed instructions for operation of processor 34, data or parameters for use by processor 34 during operation, or results of operation of processor 34.

For example, processor 34 may process a signal that is received from a flowmeter 22 in order to determine a flow rate that is indicated by that flowmeter 22. The determined flow rate may be compared with a threshold flow rate. For example, a threshold flow rate value or a threshold fractional change of a flow rate may be stored on data storage 36. Alternatively or in addition, a signal value or other value indicative of the threshold flow rate or a threshold fractional change may be stored on data storage 36. Processor 34 may be configured to compare a signal that is received from a flowmeter 22, or a result of processing of the received signal, with an appropriate threshold value. For example, a threshold value may be determined by a manufacturer or installer of noncontact support platform 10, e.g., during a calibration or setup procedure.

Alternatively or in addition, one or more external vacuum nozzles that are similar or identical in structure and operation to vacuum nozzles 14 (and vacuum hoses 20), and that are connected to vacuum source 24, may be provided outside of PV stage 12. For example, the external vacuum nozzles may be located on a part of PV stage 12 that is not intended for noncontact support of an object (e.g., a side or bottom surface of PV stage 12), or elsewhere. The location may be selected such that inflow of substances that may block the external vacuum nozzles is unlikely. Inflow through the external vacuum nozzles may also be monitored by flowmeters. The signal that is generated by the flowmeters measuring inflow through the external vacuum nozzles may serve as a reference inflow, e.g., to enable distinguishing falsely interpreting faulty operation of vacuum source 24 (or of vacuum manifold 18) from blockage.

One or more time limits or time thresholds, e.g., related to a stabilization time for a flow rate or for a flowmeter, may be stored on data storage 36. For example, when a flowmeter signal is received, processor 34 may be configured to store a value that is obtained from processing of the signal, together with a time that is indicative of the time that the signal was received or processed. When a subsequent signal is received, a currently obtained value that is indicated by the currently received signal may be compared with one or more previous values that were indicated by previously received signals. If a change is detected between a current value and a previous value that indicates a reduction in fluid flow (e.g., where the change exceeds a threshold value), subsequently obtained values may be compared with the changed value to determine if the change persists. If the change persists for a minimum period of time, processor 34 may interpret the change as indicative of blockage of the corresponding vacuum nozzle 14. Similarly, a value that indicates a low flow rate that is indicative of blockage may be detected. If repeatedly obtained values over the minimum period of time remain indicative of the low flow rate, processor 34 may interpret the value as indicative of blockage of the corresponding vacuum nozzle 14.

When processor 34 detects blockage of a vacuum nozzle 14, appropriate output may be generated. For example, processor 34 may operate output device 32 to generate output that is indicative of the blockage. Output device 32 may include, for example, one or more display screens, indicator lights, speakers, buzzers, bells, or other devices configured to produce visible or audible output.

Processor 34 may operate output device 32 to indicate the blockage. For example, processor 34 may cause a message to be displayed on a display screen of output device 32 that indicates that one or more vacuum nozzles 14 are blocked. The message may include, or may be accompanied by, an indication (e.g., on a diagram of PV stage 12, or otherwise) of a vacuum nozzle 14 that may be blocked.

In some cases, processor 34 may be configured to transmit a message that is indicative of the detected blockage and that may be received by a remote device. For example, the remote device may be associated with an operator of noncontact platform 10 or of processor 34.

In some cases, processor 34 and controller 30 may be configured to operate one or more of a vacuum source 24, a pressure source, or one or more valves. In this case, processor 34 may be configured to modify operation of vacuum source 24 when blockage is detected. For example, controller 30 may modify operation of vacuum source 24, the pressure source, or one or more valves so as to compensate for the detected blockage (e.g., maintain a uniform fluid cushion of noncontact support platform 10 that is produced by PV stage 12).

PV stage 12 may include vacuum nozzles 14 that are monitored (e.g., each provided with a flowmeter 22) and vacuum nozzles 14 that are not monitored and are not provided with flowmeters 22. Both monitored and unmonitored vacuum nozzles 14 may be connected to a single vacuum source 24. The presence of flowmeter 22 may significantly affect the rate of vacuum inflow 28 through a monitored vacuum nozzle 14 as compared a through an unmonitored vacuum nozzle 14. Therefore, in order to ensure that vacuum inflow 28 be uniform across PV stage 12 (e.g., such that an object may be supported evenly), an unmonitored vacuum nozzle 14 may be configured differently than a monitored vacuum nozzle 14. For example, an unmonitored vacuum nozzle 14 or its vacuum hose 20 may have a different diameter, internal structure, or otherwise configuration that is different from a configuration of a monitored vacuum nozzle 14. The different configuration may be configured such that vacuum inflow 28 through an unmonitored vacuum nozzle 14 is substantially equal to vacuum inflow 28 through a monitored vacuum nozzle 14.

A flowmeter 22 may include a constriction and one or more pressure transducers. For example, the pressure transducers may be configured to generate an electrical signal that may be transmitted to controller 30. When vacuum inflow 28 flows through the constriction, the signals that are produced by the pressure transducers may be indicative of a difference between the fluid pressure at a point that is upstream of the constriction and at a point that is downstream of the constriction. The difference in fluid pressure may be related to a rate of flow of vacuum inflow 28 (e.g., as determined by the minor losses due to the constriction, or otherwise).

In some cases, a flowmeter 22 may include a constriction in the form of an orifice, and separate pressure transducers for measuring fluid pressure upstream and downstream of a constriction.

FIG. 2A schematically illustrates a flowmeter with pressure transducers for blockage detection in the noncontact platform shown in FIG. 1A.

Pressure transducer orifice flowmeter 23 includes a constriction in the form of orifice 50 that is placed in vacuum hose 20 (or in a tube or hose that is connected in series with vacuum hose 20). Orifice 50 may represent a single orifice, an orifice cascade (e.g., a series of spatially separated orifices that are not coaxial with one another), or another type of constriction.

Upstream pressure transducer 52 is configured to generate an electrical signal that is indicative of fluid pressure of vacuum inflow 28 at a point that is upstream of orifice 50. Similarly, downstream pressure transducer 54 is configured to generate an electrical signal that is indicative of fluid pressure of vacuum inflow 28 at a point that is downstream to orifice 50.

The electrical signals that are produced by upstream pressure transducer 52 and by downstream pressure transducer 54 may be transmitted to controller 30. Processor 34 of controller 30 may be configured to process the electrical signals to yield a value that is indicative of a difference between fluid pressure at upstream pressure transducer 52 and at downstream pressure transducer 54. The value may thus be indicative of a flow rate of vacuum inflow 28 through vacuum hose 20. The yielded value may be compared with a previous value to determine whether there is blockage of vacuum hose 20 (e.g., at the vacuum nozzle 14 that is connected to vacuum hose 20). For example, a value that is indicative of a reduction in flow rate that exceeds a threshold reduction and that persists for a minimum period of time (e.g., a time period in a range from about 30 seconds to 60 seconds, or another minimum period of time, e.g., that corresponds to a time that is sufficient for stabilization of vacuum inflow 28 or for an accurate measurement pressure transducer orifice flowmeter 23, or otherwise determined minimum period of time) may be indicative of blockage.

Alternatively or in addition, electrical signals that are generated by upstream pressure transducer 52 and downstream pressure transducer 54, or a value that results from processing the signals, may be compared with a similar signal or value from pressure transducers of a flowmeter that measures a reference inflow through an external vacuum nozzle as described above.

In some cases, a flowmeter 22 may include a constriction in the form of an orifice, and separate a differential pressure transducer for measuring a difference in fluid pressure upstream and downstream of a constriction.

FIG. 2B shows a flowmeter with a pressure differential transducer for blockage detection in the noncontact platform shown in FIG. 1A.

Pressure differential orifice flowmeter 25 includes a constriction in the form of orifice 50 that is placed in vacuum hose 20 (or in a tube or hose that is connected in series with vacuum hose 20).

Differential pressure transducer 56 is connected to vacuum hose 20 by tube 58. Tube 58 is configured to transmit fluid pressure from vacuum hose 20 to differential pressure transducer 56. For example, tube 58 may be open to vacuum hose 20 at upstream opening 59a. Similarly, tube 58 may be open to vacuum hose 20 at downstream opening 59b. Thus, fluid pressure in vacuum hose 20 at a point that is upstream of orifice 50 may be transmitted to one surface of differential pressure transducer 56. Fluid pressure in vacuum hose 20 at a point that is downstream to orifice 50 may be transmitted to another one surface of differential pressure transducer 56.

Differential pressure transducer 56 is configured to generate an electrical signal that is indicative of difference in fluid pressure of vacuum inflow 28 between a point that is upstream of orifice 50 and a point that is downstream to orifice 50. The electrical signals that are produced by differential pressure transducer 56 may be transmitted to controller 30. Processor 34 of controller 30 may be configured to process the electrical signals to yield a value that is indicative of a difference between fluid pressure at upstream opening 59a and at downstream opening 59b. The value may thus be indicative of a flow rate of vacuum inflow 28 through vacuum hose 20. The yielded value may be compared with a previous value to determine whether there is blockage of vacuum hose 20 (e.g., at the vacuum nozzle 14 that is connected to vacuum hose 20). For example, a value that is indicative of a reduction in flow rate and that persists for a minimum period of time (e.g., a time period in a range from about 30 seconds to 60seconds, or another minimum period of time, e.g., that corresponds to a time that is sufficient for stabilization of vacuum inflow 28 or for an accurate measurement by pressure differential orifice flowmeter 25, or otherwise determined minimum period of time) may be indicative of blockage.

Alternatively or in addition, electrical signals that are generated by pressure differential orifice flowmeter 25, or a value that results from processing the signals, may be compared with a similar signal or value from a pressure differential pressure transducer of a flowmeter that measures a reference inflow through an external vacuum nozzle as described above.

Alternatively or in addition to pressure transducer orifice flowmeter 23, pressure differential orifice flowmeter 23, or other type of orifice flowmeter, flowmeter 22 may include another type of flowmeter. For example, flowmeter 22 may include a mechanical flowmeter, a Venturi flowmeter, or other type of flowmeter.

Alternatively or in addition to vacuum nozzles 14 that are each connected to vacuum manifold 18 by a separate vacuum hose 20, two or more vacuum nozzles 14 may be connected to vacuum manifold 18 by a single branched hose. A flowmeter 22 may be configured to measure fluid flow in a part of the branched hose through which flows vacuum inflow 28 from all of the connected vacuum nozzles 14.

FIG. 3A schematically illustrates an example of a non-contact platform with blockage detection in which a plurality of vacuum nozzles are connected by a branched hose to a vacuum manifold.

Noncontact support platform 40 includes a PV stage 12 that is configured to form a fluid cushion for supporting an object at an approximately fixed distance from outer surface 13 of PV stage 12. PV stage 12 typically includes a plurality of pressure nozzles 16 that are interspersed with a plurality of vacuum nozzles 14. Fluid flowing out of pressure nozzles 16 with pressure outflow 29 and into vacuum nozzles 14 with vacuum inflow 28 may create a fluid cushion at outer surface 13 for noncontact support of an object.

Vacuum nozzles 14 (representing all or some of the vacuum nozzles 14 of PV stage 12) are connected by vacuum hose 41 to vacuum manifold 18. Vacuum manifold 18 may be connected to vacuum source 24. When vacuum manifold 18 is connected to vacuum source 24 and vacuum source 24 is operating, fluid may flow inward through each vacuum nozzle 14 as indicated by vacuum inflow 28.

Vacuum hose 41 may be connected to vacuum manifold 18 by hose trunk 44. Vacuum hose 41 is branched into a plurality of branch hoses 42. Each branch hose 42 of vacuum hose 41 may be connected to a different vacuum nozzle 14.

In some cases, branch hoses 42 may represent a system of conduits that are built into, or otherwise internal to PV stage 12.

The vacuum inflows 28 through the branch hoses 42 that are connected to vacuum nozzles 14 may be combined within vacuum hose 41 to form total hose inflow 46. Total hose inflow 46 may represent the combined total fluid flow through hose trunk 44 and into vacuum manifold 18.

In some cases, vacuum inflow 28 may suck dirt, debris, soot, oils, or other particulate matter from the environment into one or more vacuum nozzles 14. The matter may at least partially obstruct the affected vacuum nozzles 14 so as to reduce vacuum inflow 28 through the affected vacuum nozzles 14. The reduction of one vacuum inflow 28 may result in reduction of total hose inflow 46.

Hose trunk 44 of vacuum hose 41 is provided with trunk flowmeter 48. Trunk flowmeter 48 is configured to produce a signal that is indicative of a flow rate of total hose inflow 46. For example, the signal may be an electrical signal that is transmissible via an electric cable, an electromagnetic signal that is transmissible via electromagnetic waves, an optical signal that is transmissible via an optical fiber or directly (e.g., along a line of sight between an optical transmitter and an optical receiver), or another type of signal. Trunk flowmeter 48 may include an orifice flowmeter, a mechanical flowmeter, a Venturi flowmeter, or another type of flowmeter.

Trunk flowmeter 48 may be configured to be sufficiently sensitive so as to enable detection of partial or total obstruction or blockage of one of vacuum nozzles 14. The effect of blockage of a single vacuum nozzle 14 on total hose inflow 46 that is measured by trunk flowmeter 48 may decrease as the number of vacuum nozzles 14 that are connected to branch hoses 42 of a single vacuum hose 41 increases. Alternatively or in addition, trunk flowmeter 48 (and a controller 30) may be configured such that only concurrent blockage of a plurality of vacuum nozzles 14 is detected. For example, trunk flowmeter 48 may be configured such that a reduction in total hose inflow 46 by about 1% to 2% may be detectible.

In some cases, a plurality of hose trunks 44 of different vacuum hoses 41 may be connected to vacuum manifold 18. For example, the branch hoses 42 of each of the vacuum hoses 41 may connect to vacuum nozzles 14 in different regions of PV stage 12. In this case, detection of reduction of total hose inflow 46 through a specific hose trunk 44 may be indicative of blockage of one or more vacuum nozzles 14 in a specific region of PV stage 12.

In some cases, two or more branch hoses 42 may join to form an intermediate hose branch. The intermediate hose branch may then join with one or more other intermediate hose branches or one or more branch hoses to form another intermediate hose branch (e.g., with a higher inflow rate than the first intermediate hose branch), or a hose trunk 44. Thus, a vacuum hose may be configured in the form of a structure in which different levels of intermediate hose branches are formed. Some or all of the intermediate hose branches may be provided with flowmeters.

Figure 3B:
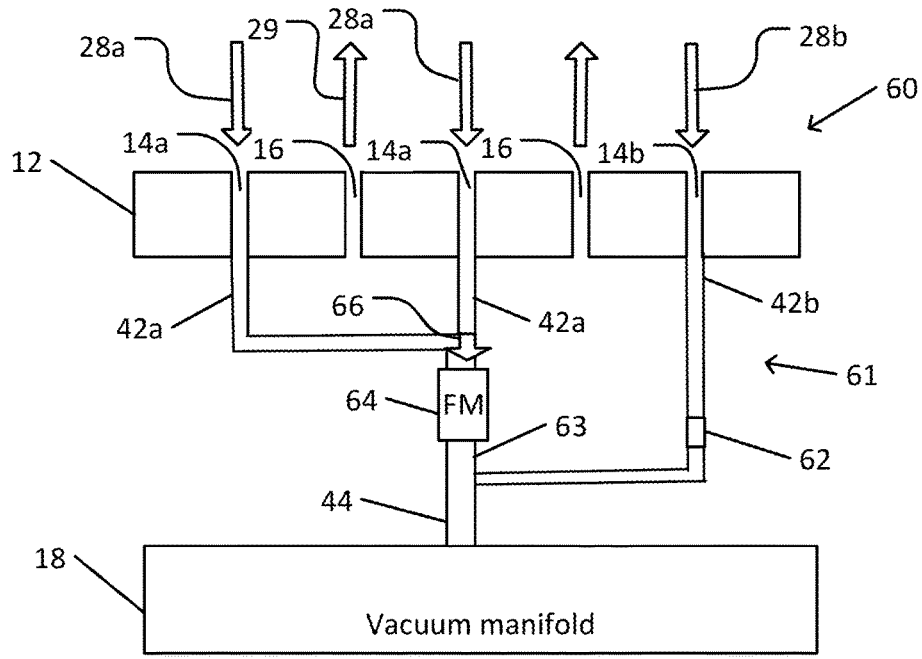
FIG. 3B schematically illustrates an example of a variant of the noncontact platform shown in FIG. 3A that includes an intermediate hose branch.

FIG. 3B schematically illustrates an example of a variant of the noncontact platform shown in FIG. 3A that includes an intermediate hose branch.

In vacuum hose 61 of noncontact support platform 60, two or more branch hoses 42a connect to form intermediate hose branch 63. Intermediate hose branch 63 is provided with intermediate branch flowmeter 64. Branch hoses 42a join to form intermediate hose branch 63 upstream of intermediate branch flowmeter 64. Vacuum inflows 28a through monitored vacuum nozzles 14a and branch hoses 42a combine to form intermediate inflow 66.

Branch hose 42b joins with intermediate hose branch 63 to form hose trunk 44 downstream of intermediate branch flowmeter 64. Thus, vacuum inflow 28b through unmonitored vacuum nozzles 14b and branch hose 42b does not contribute to intermediate inflow 66.

In some cases, a vacuum hose 61 may be formed by a structure in which different levels of branch hoses 42 form intermediate hose branches 63. For example, hose trunk 44 may bifurcate or branch into two or intermediate hose branches 63. Each intermediate hose branch 63 may branch, in turn, into two or more secondary intermediate hose branches. The bifurcation or branching may continue until the intermediate hose branches branch into branch hoses 42a.

In the example shown, inflow through branch hoses 42a is monitored by intermediate branch flowmeter 64 while vacuum inflow 28b through branch hose 42b is not. The presence of intermediate branch flowmeter 64 may significantly affect the rate of vacuum inflow 28a through branch hoses 42a. On the other hand, vacuum inflow 28b is not affected by intermediate branch flowmeter 64. Therefore, in order to ensure that vacuum inflow 28a be substantially equal to vacuum inflow 28b (e.g., such that an object may be supported evenly at a fixed distance from PV stage 12), unmonitored nozzle 14b, branch hose 42b, or both may be configured differently than monitored vacuum nozzles 14a or branch hoses 42a. For example, branch hose 28b, or its unmonitored vacuum nozzle 14b, may differ in diameter, internal structure, or otherwise from branch hose 42a or its monitored vacuum nozzle 14a. The different configuration is represented by compensation structure 62 in branch hose 62b. For example, compensation structure 62 may represent a constriction or other structure that is configured such that vacuum inflow 28b is substantially equal to vacuum inflow 28a.

A processor 34 of controller 30 may be configured to execute a method for blockage detection in vacuum nozzles 14 of a PV stage 12 of noncontact support platform 10 or 40.

Figure 4:
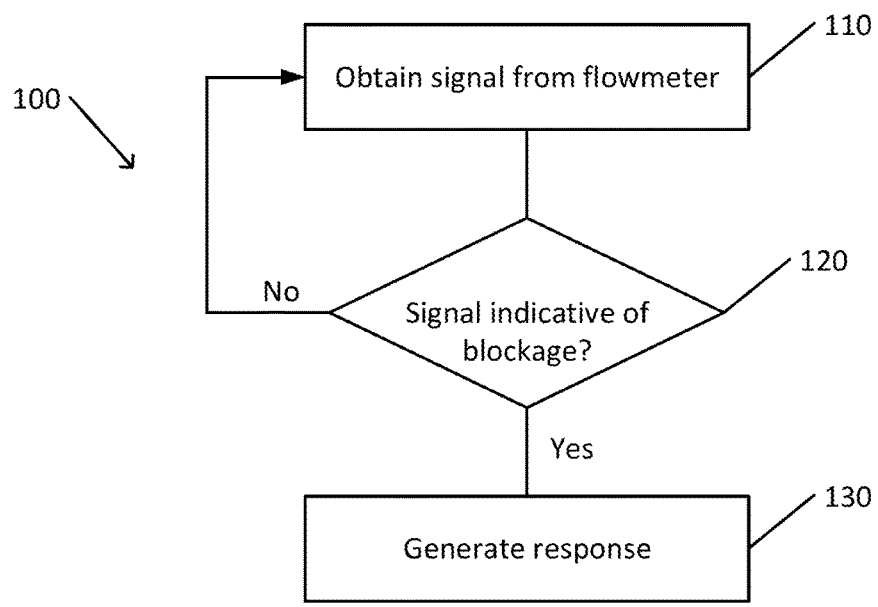
FIG. 4 is a flowchart depicting a method for blockage detection in a noncontact support platform, in accordance with an embodiment of the present invention.

FIG. 4 is a flowchart depicting a method for blockage detection in a noncontact support platform, in accordance with an embodiment of the present invention.

It should be understood, with respect to any flowchart referenced herein, that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Blockage detection method 100 may be executed by a controller 30, e.g., by a processor 34 of a controller 30 of, a noncontact support platform (e.g., noncontact support platform 10 or 40. Blockage detection method 100 may be executed continually, may be executed at predetermined intervals, or may be executed in response to a predetermined event (e.g., system power-up, or another event). Execution may be initiated by an operator of the noncontact support platform.

A signal may be obtained from a flowmeter, e.g., flowmeter 22 or trunk flowmeter 48 (block 110). For example, controller 30 may receive a signal that is transmitted by the flowmeter over a wired or wireless connection. The signal may be generated by one or more pressure transducers of the flowmeter, or otherwise.

The obtained signal may be processed to determine whether the signal is indicative of blockage of a vacuum nozzle 14 (block 120). For example, signal that is received from a pressure transducer of a flowmeter may be processed to yield a value that is indicative of a flow rate. The value may be compared with a threshold value or with a previously measured value to determine whether a current flow rate is indicative of blockage. Similarly, a value may be interpreted as indicative of blockage only if the value remains unchanged (e.g., within predetermined tolerances) for a predetermined minimum period of time.

In some cases, blockage may be determined to be indicated when inflow through a vacuum nozzle 14 is determined to be less than a reference inflow through an external vacuum nozzle. In this case, a similar reduction in vacuum inflow through a vacuum nozzle 14 and through an external nozzle may be interpreted as indicating that operation or one or more of vacuum source 24, vacuum manifold 18, or other structure common to both inflows may be faulty.

If no blockage is indicated, signals may continue to be obtained from the flowmeter (block 110).

If blockage is indicated, controller 30 may generate a response (block 130). For example, the response may include generating a signal that is perceptible to an operator of the noncontact support platform. Alternatively or in addition, the response may include modifying operation of the noncontact support platform.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A noncontact support platform comprising:
a plurality of pressure nozzles on an outer surface of a PV stage of the noncontact support platform, the pressure nozzles connected to a pressure source for creating an outflow of fluid through the pressure nozzles;
a plurality of vacuum nozzles that are interspersed with the pressure nozzles on the outer surface and that are connected to a vacuum manifold via one or a plurality of hoses to create an inflow of the fluid through the vacuum nozzles,
at least one flowmeter that is configured to generate a signal that is indicative of a measured inflow via at least one hose of said one or a plurality of hoses; and
a controller that is configured to analyze the signal to determine whether the measured inflow is indicative of blockage of a vacuum nozzle of said plurality of vacuum nozzles and to generate a response when the blockage is indicated.

2. The noncontact support platform of claim 1, wherein each vacuum nozzle of said plurality of vacuum nozzles is connected to the vacuum manifold by a separate hose.

3. The noncontact support platform of claim 2, wherein each said separate hose includes a separate flowmeter that is that is configured to generate a signal that is indicative of a measured inflow via the separate hose.

4. The noncontact support platform of claim 1, wherein a plurality of vacuum nozzles are connected to the vacuum manifold by a single branched hose.

5. The noncontact support platform of claim 4, wherein each of said plurality of vacuum nozzles is connected to a branch of the branched hose.

6. The noncontact support platform of claim 4, wherein said at least one flowmeter is located on a trunk of the branched hose, such that the at least one flowmeter is configured to generate a signal that is indicative of a measured combined inflow through the plurality of the vacuum nozzles.

7. The noncontact support platform of claim 4, wherein the branched hose includes an intermediate hose branch of the branched hose, said at least one flowmeter being located on the intermediate hose branch such that the at least one flowmeter is configured to generate a signal that is indicative of a measured combined inflow through monitored vacuum nozzles of said plurality of vacuum nozzles whose branches are connected to intermediate hose branch upstream of the at least one flowmeter.

8. The noncontact support platform of claim 7, wherein unmonitored vacuum nozzles of said plurality of vacuum nozzles whose branches join with the intermediate hose branch downstream of the at least one flowmeter are provided with compensating structure to cause the inflow through each of the unmonitored vacuum nozzles is substantially equal to inflow through each of the monitored vacuum nozzles.

9. The noncontact support platform of claim 1, wherein the at least one flowmeter comprises a constriction.

10. The noncontact support platform of claim 9, wherein the constriction comprises an orifice.

11. The noncontact support platform of claim 9, wherein the at least one flowmeter comprises a pressure transducer to generate a signal that is indicative of fluid pressure in the hose upstream of the constriction and a pressure transducer to generate a signal that is indicative of fluid pressure in the hose downstream of the constriction.

12. The noncontact support platform of claim 9, wherein the at least one flowmeter comprises a pressure transducer to generate a signal that is indicative of difference between fluid pressure upstream of the constriction and fluid pressure downstream of the constriction.

13. The noncontact support platform of claim 1, wherein the response comprises operating an output device to generate an alarm.

14. The noncontact support platform of claim 1, wherein the controller is configured to determine whether the measured inflow is indicative of the blockage by comparing the measured inflow with a threshold value of the inflow.

15. The noncontact support platform of claim 14, wherein the controller is configured to determine whether the measured inflow is indicative of the blockage by comparing the time that the measured inflow persists with a minimum time period.

16. A method for detecting blockage of one or a plurality of vacuum nozzles of a noncontact support platform, the method comprising:
    obtaining a signal that is generated by a flowmeter, the flowmeter included in a hose that connects at least one vacuum nozzle of said one or a plurality of vacuum nozzles on an outer surface of the PV stage to a vacuum manifold, the signal being indicative of a measured inflow via the hose;
    analyzing the signal to determine whether the measured inflow is indicative of blockage of a vacuum nozzle of said plurality of vacuum nozzles; and
    generating a response when the blockage is indicated.

17. The method of claim 16, wherein generating the response comprises operating an output device.

18. The method of claim 16, wherein analyzing the signal comprises processing the signal to obtain a value and comparing the obtained value with a threshold value.

19. The method of claim 18, wherein analyzing the signal comprises comparing a time of persistence of the obtained value with a minimum period of time.

20. The method of claim 18, wherein analyzing the signal comprises comparing the indicated measured inflow with inflow through an external vacuum nozzle.

* * * * *